Figure 1:
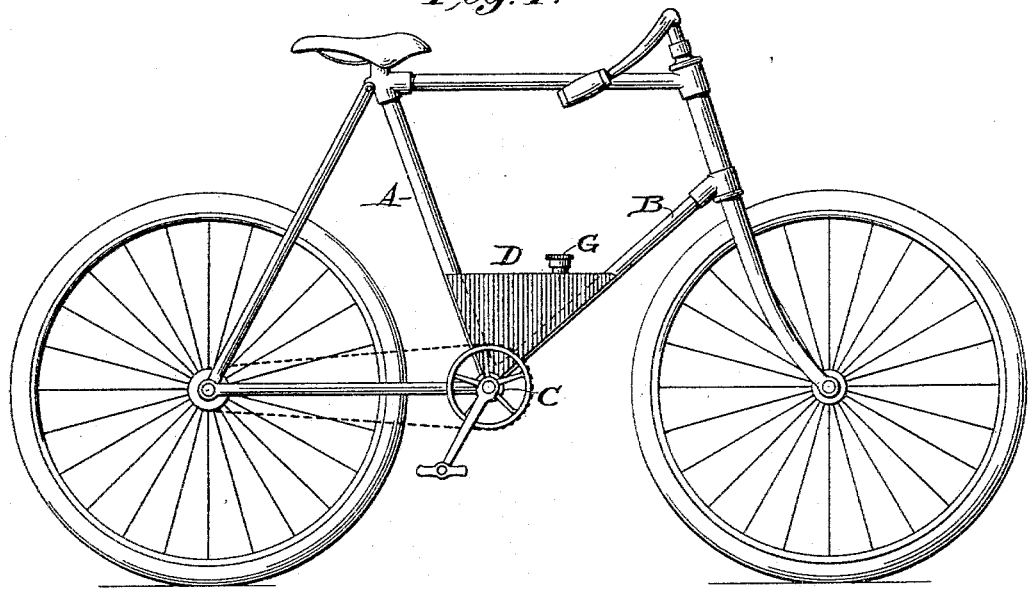
Figure 2:
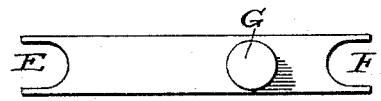
Figure 3:
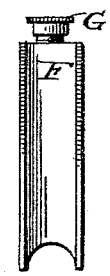

(No Model.)

L. A. HAWKINS & W. N. O. GARDNER.
BICYCLE CANTEEN.

No. 596,998. Patented Jan. 11, 1898.

Witnesses
James F. Duhamel
E. M. Mason

Inventors,
Lee A. Hawkins.
William N. O. Gardner.
by John Wedderburn
Attorney